United States Patent
Yamaura

(10) Patent No.: US 10,593,983 B2
(45) Date of Patent: Mar. 17, 2020

(54) END PLATE FOR FUEL CELL STACK

(71) Applicant: TOYOTA BOSHOKU KABUSHIKI KAISHA, Aichi-ken (JP)

(72) Inventor: Kunihiro Yamaura, Tokai (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 86 days.

(21) Appl. No.: 15/954,079

(22) Filed: Apr. 16, 2018

(65) Prior Publication Data

US 2018/0309151 A1    Oct. 25, 2018

(30) Foreign Application Priority Data

Apr. 24, 2017    (JP) .................. 2017-085463

(51) Int. Cl.
  *H01M 8/2485*    (2016.01)
  *H01M 8/0273*    (2016.01)
  *H01M 8/2475*    (2016.01)
  *H01M 8/2484*    (2016.01)
  *H01M 8/2483*    (2016.01)

(52) U.S. Cl.
  CPC ....... *H01M 8/2484* (2016.02); *H01M 8/2475* (2013.01); *H01M 8/2483* (2016.02); *H01M 8/2485* (2013.01)

(58) Field of Classification Search
  CPC .................. H01M 8/2475; H01M 8/2483
  See application file for complete search history.

(56) References Cited

U.S. PATENT DOCUMENTS

| | | | | |
|---|---|---|---|---|
| 6,372,373 B1* | 4/2002 | Gyoten | ............... | H01M 8/0254 429/461 |
| 6,531,236 B1* | 3/2003 | Hatoh | ................. | H01M 8/2483 429/454 |
| 2010/0227246 A1* | 9/2010 | Iizuka | ................. | H01M 8/0228 429/479 |
| 2011/0300460 A1* | 12/2011 | Barnard | ............ | H01M 8/04014 429/427 |
| 2012/0009506 A1* | 1/2012 | Tanahashi | ........... | H01M 8/0273 429/535 |
| 2014/0377679 A1* | 12/2014 | Yamamoto | ............ | H01M 8/006 429/454 |

(Continued)

FOREIGN PATENT DOCUMENTS

| | | |
|---|---|---|
| CA | 2911500 | 5/2016 |
| JP | 2016-96032 | 5/2016 |
| JP | 2016-134335 | 7/2016 |

*Primary Examiner* — Matthew J Merkling
(74) *Attorney, Agent, or Firm* — Greenblum & Bernstein, P.L.C.

(57) ABSTRACT

An end plate for a fuel cell stack includes a metal plate body having through-holes and inner circumference covering portions, which cover the inner circumferential surfaces of the through-holes. A part of the outer circumferential surface of the plate body that corresponds to inner ends of the inner circumference covering portions in the thickness direction is covered by an outer circumference covering portion, which is formed integrally with the inner circumference covering portions. The circumferential edge of the outer end of each through-hole is constituted by four linear portions and four arcuate portions connecting the ends of the linear portions to each other. The radius of curvature of each arcuate portion is in the range between 8 mm and 15 mm inclusive.

4 Claims, 3 Drawing Sheets

(56) References Cited

U.S. PATENT DOCUMENTS

| | | | | |
|---|---|---|---|---|
| 2016/0126563 A1* | 5/2016 | Hotta | ............... | H01M 8/0202 |
| | | | | 429/468 |
| 2016/0141662 A1* | 5/2016 | Takeyama | ......... | H01M 8/04201 |
| | | | | 429/444 |
| 2016/0344043 A1* | 11/2016 | Ichioka | ............... | H01M 8/2465 |
| 2018/0034091 A1* | 2/2018 | Shimizu | ............. | H01M 8/2483 |
| 2018/0047995 A1* | 2/2018 | Shimizu | ................. | H01M 8/02 |
| 2018/0287183 A1* | 10/2018 | Yamaura | ............ | H01M 8/0273 |
| 2018/0309151 A1* | 10/2018 | Yamaura | ............ | H01M 8/2484 |

* cited by examiner

END PLATE FOR FUEL CELL STACK

BACKGROUND

The present invention relates to an end plate provided at an end in the cell stacking direction of a cell stack body of a fuel cell stack. The end plate has circulation holes for circulating fluid to and from passages of the cell stack body.

A fuel cell has a fuel cell stack (for example, refer to Japanese Laid-Open Patent Publications No. 2016-134335 and No. 2016-96032). The fuel cell stack includes a cell stack body constituted by plate-shaped single cells stacked in the thickness direction, a pair of end plates holding the cell stack body in between in the cell stacking direction, and connecting pipes connected to the end plates.

Conventional end plates, such as those disclosed in Japanese Laid-Open Patent Publications No. 2016-134335 and No. 2016-96032, include circulation holes for circulating anode gas, cathode gas, and cooling medium (hereinafter, collectively referred to as fluid) to and from the passages formed in the cell stack body. The end plate includes a metal plate body having through-holes constituting the circulation holes and inner circumference covering portions, which cover the inner circumferential surfaces of the through-holes. The plate body is made of, for example, aluminum. The inner circumference covering portions are made of an electrically insulating plastic such as polypropylene. The inner circumference covering portions are formed integrally with the plate body by injecting molten plastic into a mold with the plate body inserted into the mold.

Japanese Laid-Open Patent Publication No. 2016-134335 discloses that it is preferable to set the cross-sectional shape of the passages of the cell stack body to a rectangle to increase the cross-sectional flow area, thereby reducing the pressure loss of the fluid. The publication also discloses that it is preferable to set the cross-sectional shape of the connecting pipes connected to the end plate to a circle to reduce the pressure loss of the fluid flowing through the connecting pipes. Refer to paragraph [0025] of the publication. Furthermore, the publication discloses that it is preferable to set, to a rectangle, the cross-sectional shape of the section of each inner circumference covering portion that is opposed to the passage of the cell stack body, set, to a substantially perfect circle, the cross-sectional shape of the section of each inner circumference covering portion that is opposed to the connecting pipe, and gradually change the cross-sectional shape of the intermediate section of each inner circumference covering portion from a rectangle to a substantially perfect circle.

The plate body of the end plate disclosed in Japanese Laid-Open Patent Publication No. 2016-96032 includes a main portion having through-holes and a flange portion protruding away from the outer circumference of the main portion. The flange portion has a fastening surface, to which the flange of the case accommodating the cell stack body is fastened (see FIGS. 7, 8 and 10 of the publication). Further, in the end plate of the publication, the outer circumferential surface of the main portion is covered by an outer circumference covering portion, which is integrally formed with the inner circumference covering portions, while the outer circumferential surface of the flange portion is not covered with plastic and is exposed.

In the end plate disclosed in Japanese Laid-Open Patent Publication No. 2016-96032, the cross-sectional shape of each inner circumference covering portion may be gradually changed from a rectangle to a substantially perfect circle as in the end plate disclosed in Japanese Laid-Open Patent Publication No. 2016-134335. This configuration would, however, disadvantageously complicates the shape of the through-holes and the mold and limit the cross-sectional flow area since the section of each inner circumference covering portion that is opposed to the connecting pipe has the shape of a substantially perfect circle, resulting in an increased pressure loss.

On the other hand, if the cross-sectional shape of the section of each inner circumference covering portion that is opposed to the connecting pipe is made rectangular, the shape of the circumferential edge of the corresponding through-hole at the end facing the connecting pipe (hereinafter, referred to as an outer end) will be rectangular. In this case, due to the injection molding pressure of plastic at the time of insert molding, the stress tends to concentrate at the corner portions of the circumferential edge of the outer end of the through-hole, which can deform the circumferential edge of the outer end of the through-hole. Thus, in order to prevent deformation of the plate body, additional measures such as an increased thickness of the plate body are required.

SUMMARY

It is an objective of the present invention to provide an end plate for a fuel cell stack that reliably forms inner circumference covering portions while ensuring the cross-sectional flow area of each circulation hole at the outer end.

To achieve the foregoing objective, an end plate for a fuel cell stack IS provided. The end plate is configured to be arranged at an end in a stacking direction of a cell stack body of the fuel cell stack. The end plate has a plurality of circulation holes for circulating fluid to and from a plurality of passages of the cell stack body. The end plate includes a metal plate and a plurality of inner circumferential covering portions. The metal plate body has a plurality of through-holes that respectively constitute the circulation holes. The inner circumferential covering portions are made of a plastic. Each inner circumferential portion covers an inner circumferential surface of one of the through-holes. A side in a thickness direction of the plate body closer to the cell stack body is an inner side. A side away from the cell stack body in the thickness direction is an outer side. A part of an outer circumferential surface of the plate body that corresponds to inner ends of the inner circumference covering portions in the thickness direction is covered by an outer circumference covering portion, which is formed integrally with the inner circumference covering portions. A part of the outer circumferential surface of the plate body that corresponds to outer ends of the inner circumference covering portions in the thickness direction is exposed. A circumferential edge of an outer end of each through-hole is constituted by four linear portions and four arcuate portions connecting ends of the linear portions to each other. A radius of curvature of each of the arcuate portions is in a range between 8 mm and 15 mm inclusive.

DETAILED DESCRIPTION OF THE PREFERRED EMBODIMENTS

One embodiment will now be described with reference to FIGS. 1 to 5.

Figure 1:
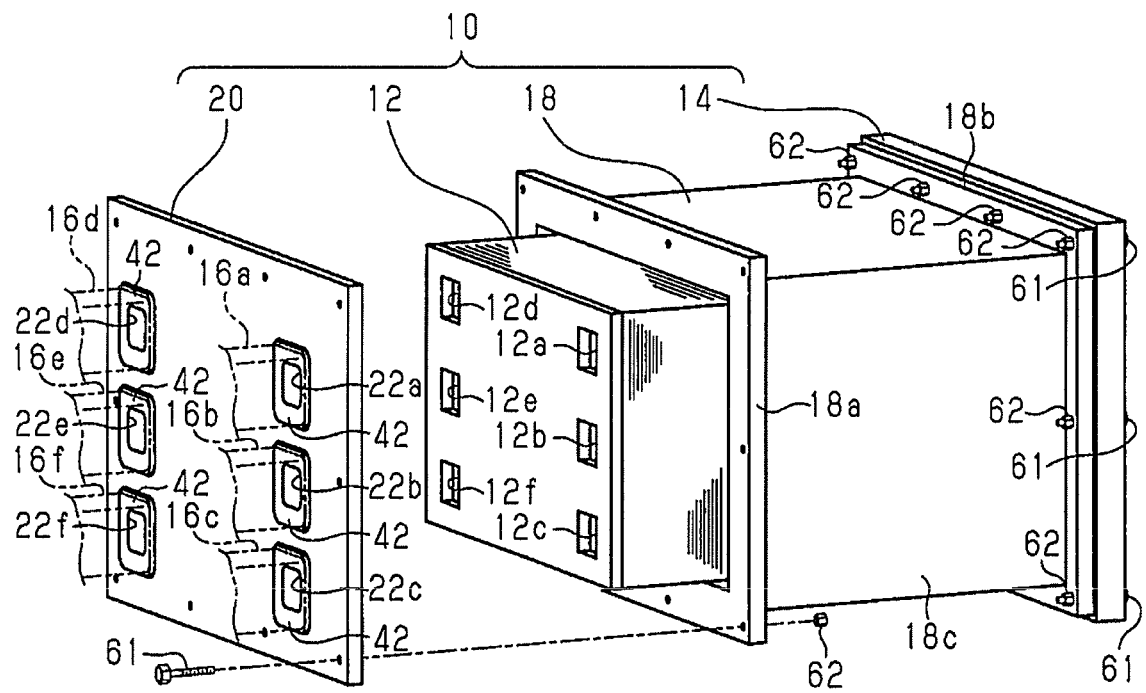
FIG. 1 is an exploded perspective view of an end plate for a fuel cell stack according to one embodiment, showing the end plate, a cell stack body, a case, and another end plate separated from each other.
Figure 2:
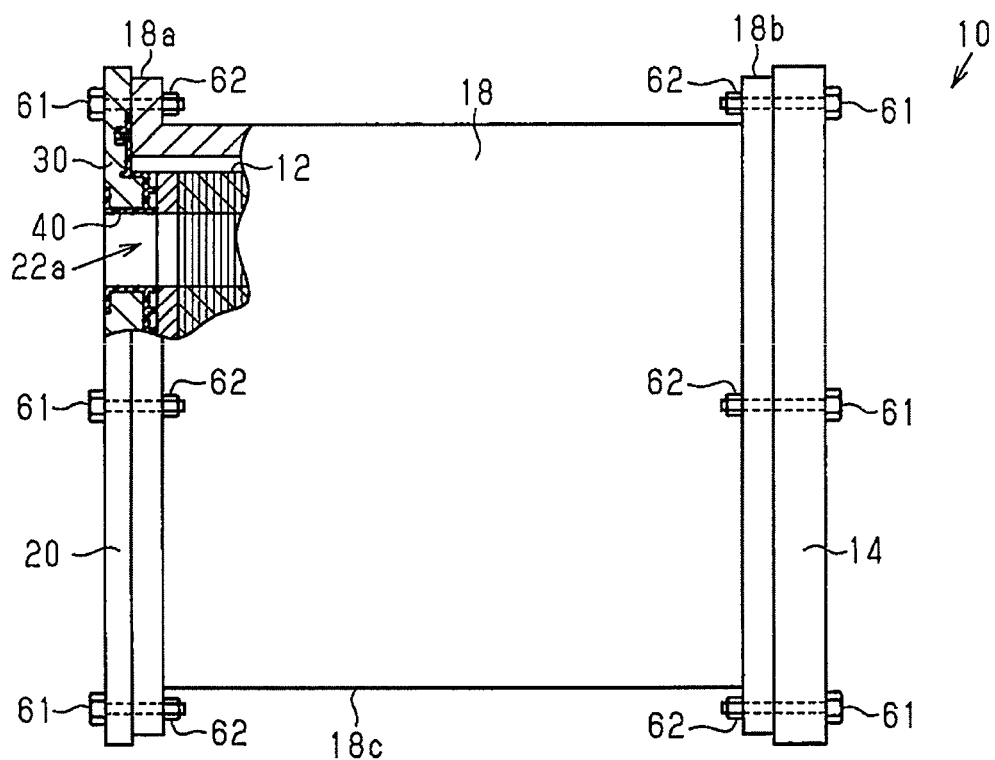
FIG. 2 is a side view showing the fuel cell stack of the same embodiment.

As shown in FIGS. 1 and 2, a fuel cell stack 10 includes a cell stack body 12, a case 18 for accommodating the cell stack body 12, and a pair of end plates 14, 20 holding the cell stack body 12 from the opposite sides in the cell stacking direction. The cell stack body 12 is constituted by plate-shaped single cells stacked in the thickness direction. In the following description, the cell stacking direction of the cell stack body 12 will simply be referred to as the stacking direction.

<Cell Stack Body 12>

As shown in FIG. 1, the cell stack body 12 has three passages 12a to 12c that respectively supply anode gas (for example, hydrogen gas), cathode gas (for example, oxygen gas in the air), and a cooling medium (for example, cooling water) to each single cell. The cell stack body 12 has another three passages 12d to 12f that respectively discharge the anode gas, the cathode gas, and the cooling medium, which have been used to generate power in each single cell. FIG. 1 illustrates a state in which part of the cell stack body 12 protrudes outward from the case 18.

<Case 18>

As shown in FIGS. 1 and 2, the case 18 has a circumferential wall 18c surrounding the outer circumference of the cell stack body 12. Both ends in the stacking direction of the case 18 are open. Flanges 18a and 18b are respectively formed on the circumferential edges of these openings.

<End Plates 14, 20>

As shown in FIG. 1, the end plate 20 has circulation holes 22a to 22f, which respectively circulate anode gas, cathode gas, and a cooling medium (hereinafter, collectively referred to as fluid) to and from the passages 12a to 12f of the cell stack body 12.

As indicated by the long dashed double-short dashed lines in FIG. 1, connecting pipes 16a to 16f for supplying and discharging anode gas, cathode gas, and a cooling medium are respectively connected to the circulation holes 22a to 22f of the end plate 20.

The other end plate 14 has no circulation holes.

The configuration of the end plate 20 will now be described.

Figure 3:
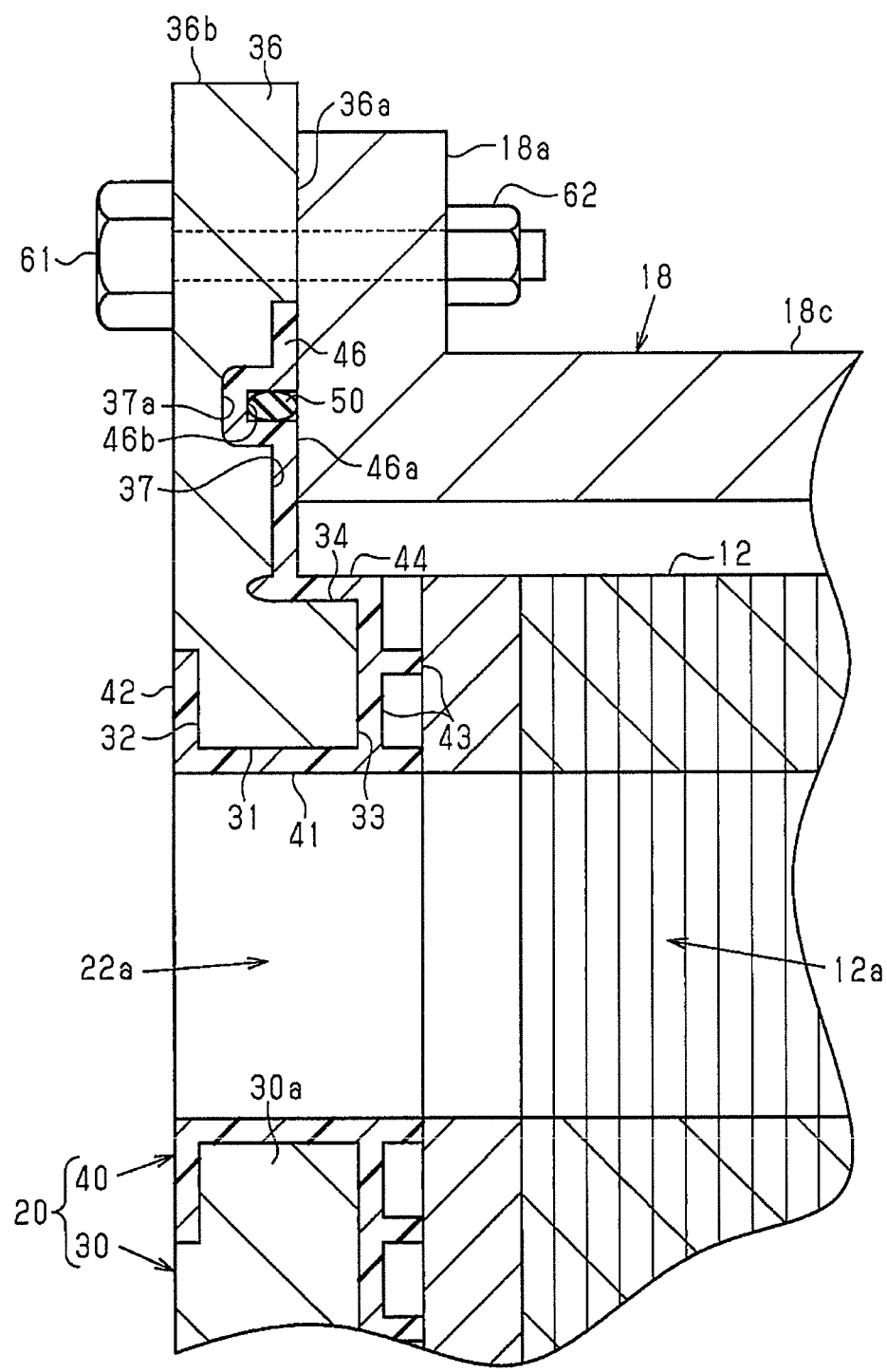
FIG. 3 is an enlarged cross-sectional view illustrating a part of FIG. 2.

As shown in FIG. 3, the end plate 20 includes a metal plate body 30 with through-holes 31 and a covering portion 40 made of plastic. The covering portion 40 has inner circumference covering portions 41 respectively covering the inner circumferential surfaces of the through-holes 31. The through-holes 31 respectively constitute the circulation holes 22a to 22f. The plate body 30 is made of, for example, aluminum. The covering portion 40 is made of an electrically insulating plastic such as polypropylene.

The plate body 30 is formed by die casting, which is a metal casting process. The covering portion 40 is integrally molded with the plate body 30 by insert molding, in which molten plastic is injected into the mold with the plate body 30 inserted into the mold.

In the following description, the side in the thickness direction of the plate body 30 closer to the cell stack body 12 (the right side in FIG. 3) will be referred to as the inner side, and the side away from the cell stack body 12 (the left side in FIG. 3) will be referred to as the outer side.

Figure 4:
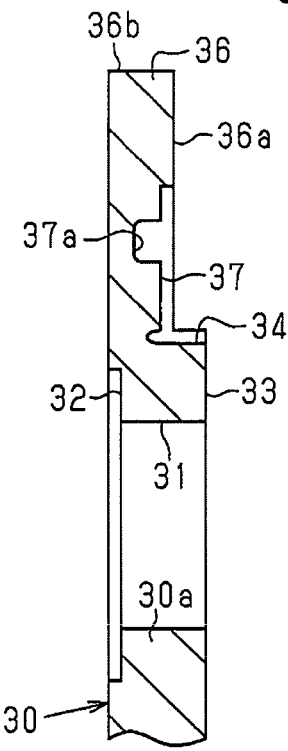
FIG. 4 is a cross-sectional view showing a part of the plate body, which constitutes the end plate of the same embodiment.

As shown in FIGS. 3 and 4, the plate body 30 includes a main portion 30a, in which the through-holes 31 are formed, and a flange portion 36 protruding away from the outer circumference of the main portion 30a.

As shown in FIG. 3, the inner end face of the flange portion 36 constitutes a fastening surface 36a. The flange portion 36 and the flange 18a are fastened together by bolts 61 and nuts 62 with the fastening surface 36a of the flange portion 36 and the flange 18a of the case 18 in contact with each other.

As shown in FIGS. 3 and 4, an inner end face 33 of the main portion 30a is located inward of the fastening surface 36a of the flange portion 36.

The plate body 30 has enlarging recesses 32 in the outer end face of the main portion 30a. Each enlarging recess 32 is larger than the center portion of the corresponding through-hole 31.

The flange portion 36 has an opposed recess 37 on the inner end face. The opposed recess 37 is arranged in an inner circumferential portion over the entire circumference. The opposed recess 37 is opposed to the flange 18a of the case 18 and extends to the outer circumferential surface 34 of the main portion 30a. A gasket portion 37a, which is constituted by a loop-shaped groove deeper than the other portions, is formed in part of the opposed recess 37 that is opposed to the flange 18a of the case 18.

As shown in FIG. 3, each enlarging recesses 32 of the main portion 30a is filled with an outer flange portion 42, which constitutes the outer end of the corresponding inner circumference covering portion 41 of the covering portion 40. Each outer flange portion 42 is brought into contact with the end face of the corresponding one of the connecting pipes 16a to 16f.

The inner end face 33 of the main portion 30a is covered by an inner covering portion 43, which extends from the inner ends of the inner circumference covering portions 41 of the covering portion 40. The inner covering portion 43 abuts against the end face of the cell stack body 12.

The outer circumferential surface 34 of the main portion 30a is covered by an outer circumference covering portion 44, which extends from the inner covering portion 43.

The opposed recess 37 of the flange portion 36 is filled with an opposed portion 46 extending from the outer circumference covering portion 44. An inner end face 46a of the opposed portion 46 is formed on the same plane as the fastening surface 36a of the flange portion 36.

The opposed portion 46 has a loop-shaped receiving groove 46b formed in a part of the inner end face 46a that corresponds to the gasket portion 37a. The receiving groove 46b receives a loop-shaped gasket 50, which seals the gap between the end plate 20 and the case 18.

Figure 5:
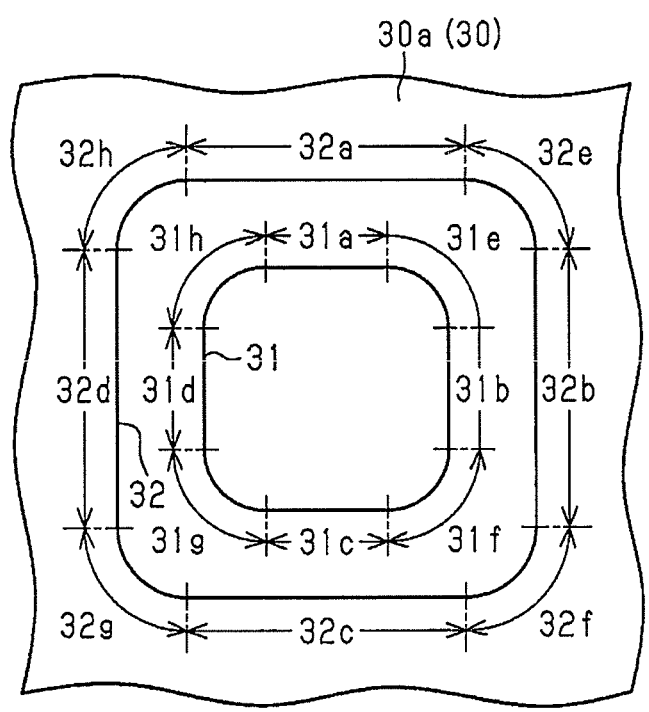
FIG. 5 is a front view mainly showing a through-hole of the plate body of the same embodiment as viewed from the outer side.

As shown in FIG. 5, the circumferential edge of each enlarging recess 32, that is, the circumferential edge of the outer end of each through-hole 31 is formed by four linear portions 32a to 32d and four arcuate portions 32e to 32h, which connect the ends of the linear portions 32a to 32d to each other, so as to have a substantially rectangular shape.

It is preferable that the radius of curvature of each of the arcuate portions 32e to 32h is in the range between 8 mm and 15 mm inclusive.

If the radius of curvature is less than 8 mm, the stress generated at the circumferential edge of the outer end of each through-hole 31 during the insert molding of the covering portion 40 may exceed the allowable stress.

If the radius of curvature is greater than 15 mm, the cross-sectional flow area at the outer end of each of the circulation holes 22a to 22f will be restricted more than necessary.

It is further preferable that the radius of curvature is in the range between 10 mm and 12 mm inclusive.

An operation of the present embodiment will now be described.

When insert-molding the covering portion 40, the plate body 30 is pressed from the outer circumferential side by a die (not shown) so as to restrict deformation of the plate body 30 due to the injection molding pressure of the plastic.

However, even if the plate body 30 is pressed from the outer circumferential side by the die, it is difficult to reliably avoid deformation of the circumferential edge of the outer end of each of the through-holes 31 in the plate body 30 as described above.

That is, at the inner end of each through-hole 31, the injection molding pressure at the time of forming the inner circumference covering portion 41 and the injection molding pressure at the time of forming the outer circumference covering portion 44 cancel each other out. Deformation is thus unlikely to occur. In contrast, at the outer end of each through-hole 31, the injection molding pressure at the time of forming the inner circumference covering portion 41 is not canceled out since the outer circumferential surface 36b of the flange portion 36 is not covered with plastic. Therefore, the circumferential edge of the outer end of each through-hole 31 tends to be deformed by the injection molding pressure.

In this respect, since the radius of curvature of the arcuate portions 32e to 32h is in the range between 8 mm and 15 mm inclusive in the present embodiment. Thus, when insert-molding the covering portion 40 (the inner circumference covering portions 41 and the outer circumference covering portion 44), it is possible to reduce the stress generated at the circumferential edge at the outer end of each through-hole 31 to a value less than the allowable maximum stress. Therefore, it is possible to reliably avoid deformation of the circumferential edge of the outer end of each through-hole 31 caused by insert molding.

The end plate for a fuel cell stack according to the above-described embodiment achieves the following advantage.

(1) The end plate 20 includes the plate body 30, which has the main portion 30a and the flange portion 36. The outer circumferential surface 34 of the main portion 30a is covered by the outer circumference covering portion 44. The outer circumferential surface 36b of the flange portion 36 is exposed. Each through-hole 31 has an enlarging recess 32, which is recessed in the outer end face of the main portion 30a and is larger than the central portion of the through-hole 31. Each inner circumference covering portion 41 has an outer flange portion 42 filling the enlarging recess 32 of the corresponding through-hole 31. The circumferential edge of each enlarging recess 32 configures the circumferential edge of the outer end of the corresponding through-hole 31 and is formed by the four linear portions 32a to 32d and the four arcuate portions 32e to 32h, which connect the ends of the linear portions 32a to 32d together. The radius of curvature of each of the arcuate portions 32e to 32h is in the range between 8 mm and 15 mm inclusive.

With this configuration, when insert-molding the covering portion 40 (the inner circumference covering portions 41 and the outer circumference covering portion 44), the stress generated at the circumferential edge of the outer end of each through-hole 31 is reduced to the allowable stress range. Therefore, it is possible to reliably avoid deformation of the circumferential edge of the outer end of each through-hole 31 caused by insert molding. This reliably forms the inner circumference covering portions 41, while ensuring the cross-sectional flow area at the outer end of each circulation hole.

<Modifications>

The above-described embodiment may be modified as follows.

The plate body 30 may have no enlarging recesses 32. In this case, it is only necessary to form the circumferential edge of the outer end of each through-hole 31 by the four linear portions 31a to 31d and the four arcuate portions 31e to 31h, which connect the ends of the linear portions 31a to 31d, and to set the radius of curvature of each of the arcuate portions 31e to 31h in the range between 8 mm and 15 mm inclusive.

What is claimed is:

1. An end plate for a fuel cell stack, the end plate being configured to be arranged at an end in a stacking direction of a cell stack body of the fuel cell stack, wherein the end plate has a plurality of circulation holes to circulate fluid to and from a plurality of passages of the cell stack body, the end plate comprising:
   a metal plate body having a plurality of through-holes that respectively constitute the circulation holes; and
   a plurality of inner circumference cover portions made of a plastic, each inner circumference cover portion covering an inner circumferential surface of one of the through-holes, wherein
   a side of the plate body facing the cell stack body in a thickness direction of the plate body is an inner side,
   a side of the plate body facing away from the cell stack body in the thickness direction is an outer side,
   a part of an outer circumferential surface of the plate body that extends to the inner side is covered by an outer circumference cover portion, which is formed integrally with the inner circumference cover portions,
   a part of the outer circumferential surface of the plate body that extends to the outer side is exposed,
   a circumferential edge of an outer end of each through-hole is constituted by four linear portions and four arcuate portions connecting ends of the linear portions to each other, and
   a radius of curvature of each of the arcuate portions is in a range between 8 mm and 15 mm inclusive.

2. The end plate for a fuel cell stack according to claim 1, wherein
   each through-hole has an enlarging recess, which is recessed in an outer end face of the plate body and is larger than a center portion of the through-hole,
   each inner circumference cover portion fills the enlarging recess of the corresponding through-hole, and
   a circumferential edge of each enlarging recess configures the circumferential edge of the outer end of the corresponding through-hole and is constituted by the four linear portions and the four arcuate portions connecting the ends of the linear portions to each other.

3. The end plate for a fuel cell stack according to claim 2, wherein
   the circumferential edge of each enlarging recess surrounds a circumferential edge of the center portion of the corresponding through hole in a plan view of the outer side.

4. The end plate for a fuel cell stack according to claim 3, wherein
the circumferential edge of the center portion is constituted by four additional linear portions and four additional arcuate portions connecting ends of the additional linear portions to each other.

* * * * *